(12) United States Patent
Pugh

(10) Patent No.: US 11,067,474 B2
(45) Date of Patent: Jul. 20, 2021

(54) METHODS AND SYSTEMS FOR CONTROLLING IMPACT

(71) Applicant: American Honda Motor Co., Inc., Torrance, CA (US)

(72) Inventor: Michael Jason O'neal Pugh, Greensboro, NC (US)

(73) Assignee: American Honda Motor Company, Inc., Torrance, CA (US)

( * ) Notice: Subject to any disclaimer, the term of this patent is extended or adjusted under 35 U.S.C. 154(b) by 170 days.

(21) Appl. No.: 16/524,465

(22) Filed: Jul. 29, 2019

(65) Prior Publication Data
US 2021/0033488 A1   Feb. 4, 2021

(51) Int. Cl.
| G01M 7/08 | (2006.01) |
| G01L 5/00 | (2006.01) |
| G01N 3/307 | (2006.01) |
| G01L 5/14 | (2006.01) |

(52) U.S. Cl.
CPC ............ *G01M 7/08* (2013.01); *G01L 5/0052* (2013.01); *G01N 3/307* (2013.01); *G01L 5/0061* (2013.01); *G01L 5/14* (2013.01)

(58) Field of Classification Search
CPC ..... G01N 3/307; G01L 5/0052; G01L 5/0061; G01L 5/14; G01M 7/08
See application file for complete search history.

(56) References Cited

U.S. PATENT DOCUMENTS

| 1,809,347 A | * | 6/1931 | Martin | G01M 17/02 |
| | | | | 73/12.06 |
| 1,901,460 A | | 3/1933 | Lewis | |
| 2,590,486 A | | 2/1950 | Aubert | |
| 2,755,658 A | * | 7/1956 | Brown | G01P 21/00 |
| | | | | 73/12.13 |
| 2,767,573 A | * | 10/1956 | De Vost | G01N 3/303 |
| | | | | 73/12.06 |
| 3,103,116 A | | 9/1963 | Kohli | |
| 3,106,834 A | | 10/1963 | Parstorfer | |
| 3,209,590 A | | 10/1965 | Colby | |
| 4,505,362 A | | 3/1985 | Layotte et al. | |

(Continued)

FOREIGN PATENT DOCUMENTS

| CN | 108254270 A | 7/2018 |
| DE | 2514626 A1 | 10/1976 |

(Continued)

OTHER PUBLICATIONS

Jackson et al., "Use of a New Portable Instrumented Impactor on the NASA Composite Crew Module Damage Tolerance Program", Proceedings of the American Society for Composites 29th Conference and 16th US-Japan Conference and ASTM D30 Meeting.

*Primary Examiner* — Jonathan M Dunlap
(74) *Attorney, Agent, or Firm* — Stinson LLP

(57) ABSTRACT

An impact test device includes a control rail and a carriage assembly moveable along the control rail in a plurality of directions including a first direction and a second direction opposite the first direction. The carriage assembly includes a catch configured to engage the control rail to control movement of the carriage assembly. Movement of the carriage assembly in the first direction urges the catch to disengage from the control rail, and movement of the carriage assembly in the second direction urges the catch to engage the control rail.

20 Claims, 6 Drawing Sheets

(56) References Cited

U.S. PATENT DOCUMENTS

| | | |
|---|---|---|
| 5,540,078 A | 7/1996 | Ambur et al. |
| 8,210,024 B2 | 7/2012 | Powers |
| 8,408,042 B2 | 4/2013 | Perrier et al. |
| 9,717,901 B2 | 8/2017 | Jackson et al. |
| 9,970,884 B1 | 5/2018 | Rastegar et al. |
| 2009/0031783 A1 | 2/2009 | Fukushima et al. |
| 2017/0176308 A1 | 6/2017 | Koning |

FOREIGN PATENT DOCUMENTS

| | | |
|---|---|---|
| EP | 2887048 A1 | 1/2014 |
| KR | 20120005421 A | 1/2012 |

\* cited by examiner

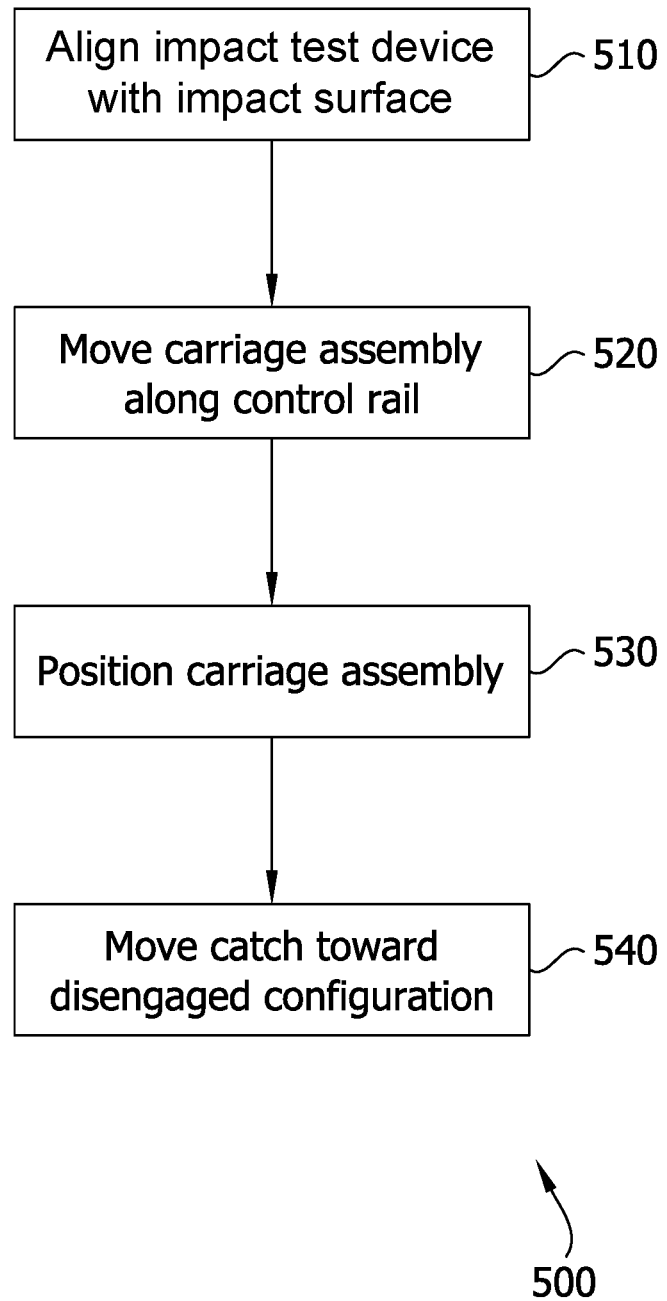

METHODS AND SYSTEMS FOR CONTROLLING IMPACT

BACKGROUND

Impact tests are performed to simulate various real-world impact forces endured by an object and evaluate an impact response of the object. The impact response may be evaluated, for example, to determine a likelihood or degree of damage or failure of the object.

Some known methods and systems for performing impact tests involve dropping masses onto a test object. At least some such methods and systems are not designed to simulate upward impact forces (e.g., against gravity) and, thus, have limited applicability. Additionally, at least some such methods and systems allow the dropped mass to bounce off of the test object and re-impact the test object.

Moreover, at least some conventional impact test systems, including drop tower impactors, pendulum impactors, and cantilever spring impactors, occupy a lot of space and/or require a controlled environment to operate. Such impact test systems require small test specimens or coupons, which may not behave in the same manner as a full-scale structure when impacted.

SUMMARY

Examples of the disclosure enable impact tests to be performed on various materials and/or structures. In one aspect, an impact test device is provided. The impact test device includes a control rail and a carriage assembly moveable along the control rail in a plurality of directions including a first direction and a second direction opposite the first direction. The carriage assembly includes a catch configured to engage the control rail to control movement of the carriage assembly. Movement of the carriage assembly in the first direction urges the catch to disengage from the control rail, and movement of the carriage assembly in the second direction urges the catch to engage the control rail.

In another aspect, a method is provided for assembling an impact test device for use in controlling impact. The method includes extending a control rail through an opening defined in a carriage plate such that the carriage plate is slideable along the control rail in a plurality of directions including a first direction and a second direction, coupling a catch to the carriage plate using a hinge such that the catch is moveable between an engaged configuration in which the catch is engaged with the control rail and a disengaged configuration in which the catch is disengaged from the control rail, and coupling a weight to the catch such that movement of a carriage assembly including the carriage plate, the catch, and the weight in the first direction urges the catch to disengage from the control rail and movement of the carriage assembly in the second direction urges the catch to engage the control rail.

In yet another aspect, a method is provided for controlling impact using an impact test device. The method includes aligning the impact test device with an impact surface. The impact test device includes a control rail and a carriage assembly moveable along the control rail. The carriage assembly includes a catch moveable between an engaged configuration in which the catch is engaged with the control rail and a disengaged configuration in which the catch is disengaged from the control rail. The carriage assembly is moved along the control rail away from the impact surface and positioned at a predetermined location. The catch is urged toward the engaged configuration when the carriage assembly is positioned at the predetermined location. The catch is moved toward the disengaged configuration such that the carriage assembly is allowed to move towards the impact surface and impacts the impact surface. The catch is urged toward the disengaged configuration before the carriage assembly impacts the impact surface and is urged toward the engaged configuration after the carriage assembly impacts the impact surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 includes a flowchart of an example method of controlling impact using an impact test device, such as the impact test device shown in FIGS. 2 and 3.

Figure 1:
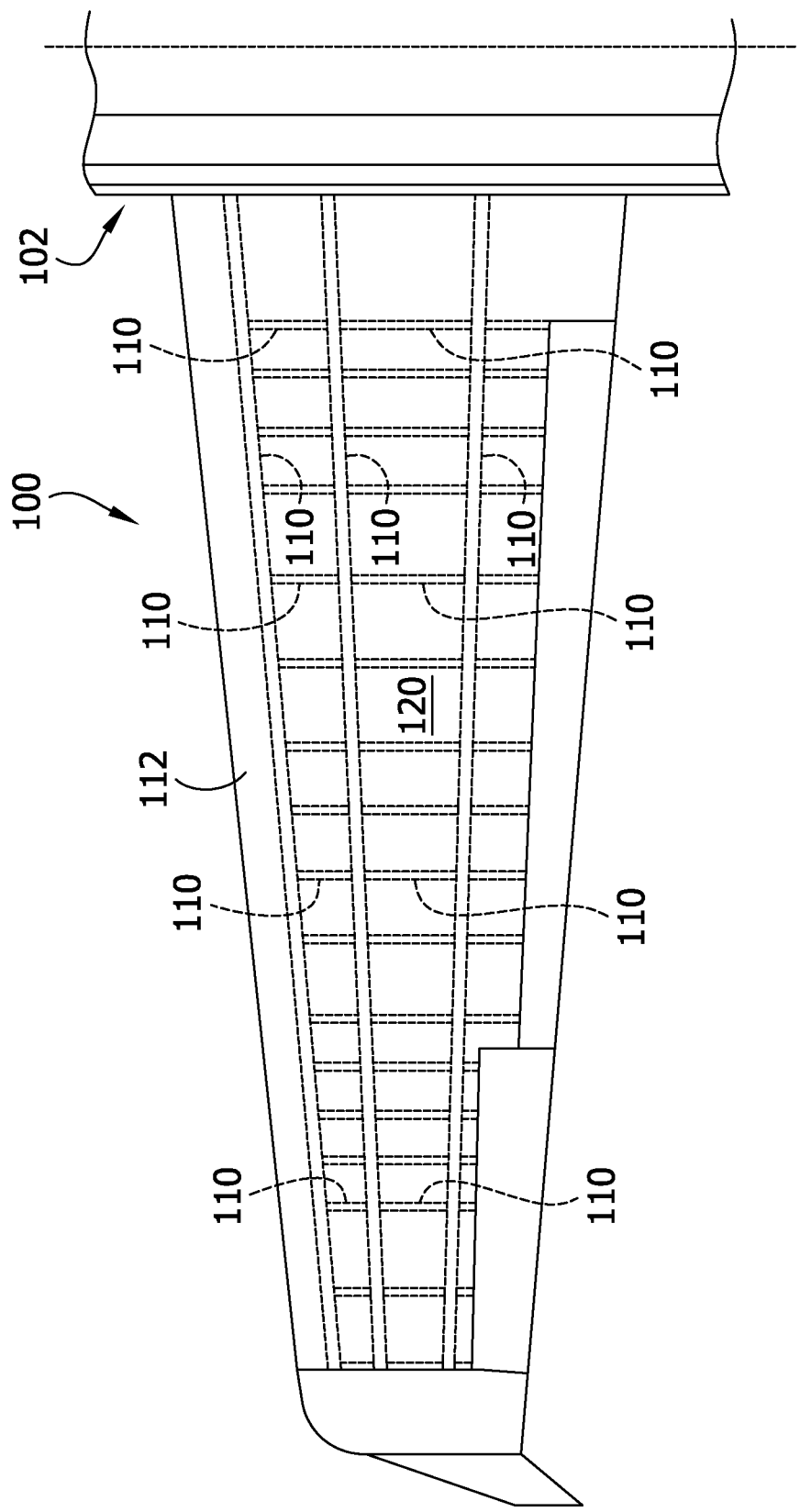
FIG. 1 includes a top view of an example aircraft wing.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to material testing systems and, more particularly, to methods and systems for controlling impact. Examples described herein include a control rail and a carriage assembly moveable along the control rail. The carriage assembly may include a catch that engages the control rail to control movement of the carriage assembly. Movement of the carriage assembly in one direction may urge the catch to disengage from the control rail, for example, while movement of the carriage assembly in an opposite direction may urge the catch to engage the control rail.

Examples described herein may be used to perform impact tests in any orientation or direction, including in an inverted or upside-down orientation. The carriage assembly may be propelled toward an impact surface, for example, using a drive mechanism. Some example drive mechanisms described herein may be adjusted to ensure that the carriage assembly is free from any contact forces immediately prior to impact. That is, once the drive mechanism is unloaded, inertial forces may continue to move the carriage assembly towards the impact surface. In this manner, impact forces imparted on the impact surface may correspond directly to the inertial force of the carriage assembly.

Certain terminology is used in the present disclosure for convenience and reference only and not in a limiting sense. For example, the terms "lower," "upper," "downward," "upward," "vertical," "above," "under," "upright," "upside-down," "fall," and the like designate directions in relation to the perspective shown in the drawings. One of ordinary skill in the art would understand and appreciate that the example methods and systems may be used in various orientations. Moreover, while the examples described herein are described with respect to material testing systems, one of ordinary skill in the art would understand and appreciate that the example methods and systems may be used for various other uses and/or applications.

FIG. 1 shows an example aircraft wing 100 coupled to a fuselage 102 of an aircraft. The aircraft wing 100 includes a plurality of support members 110 forming a skeletal shape for the aircraft wing 100. Example support members 110 may include, without limitation, spars, ribs, longerons, stiffeners, and/or stringers. The aircraft wing 100 includes one or more panel members 120 forming a skin of the aircraft wing 100. The panel members 120 may extend, for example, generally over and between upper ends of the support members 110, and/or under and between lower ends of the support members 110.

Figure 2:
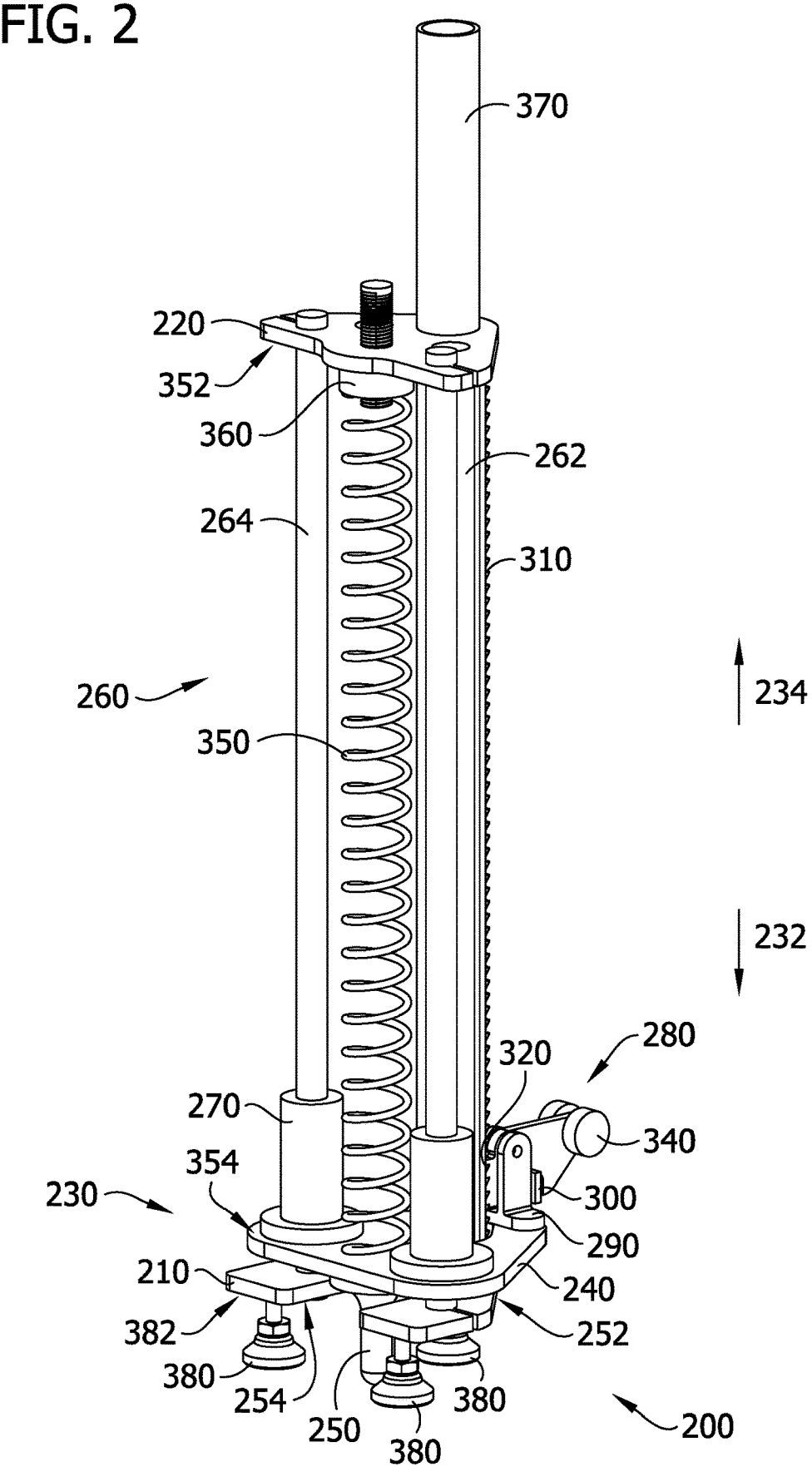
FIG. 2 includes an upper perspective view of an example impact test device in a first state.
Figure 3:
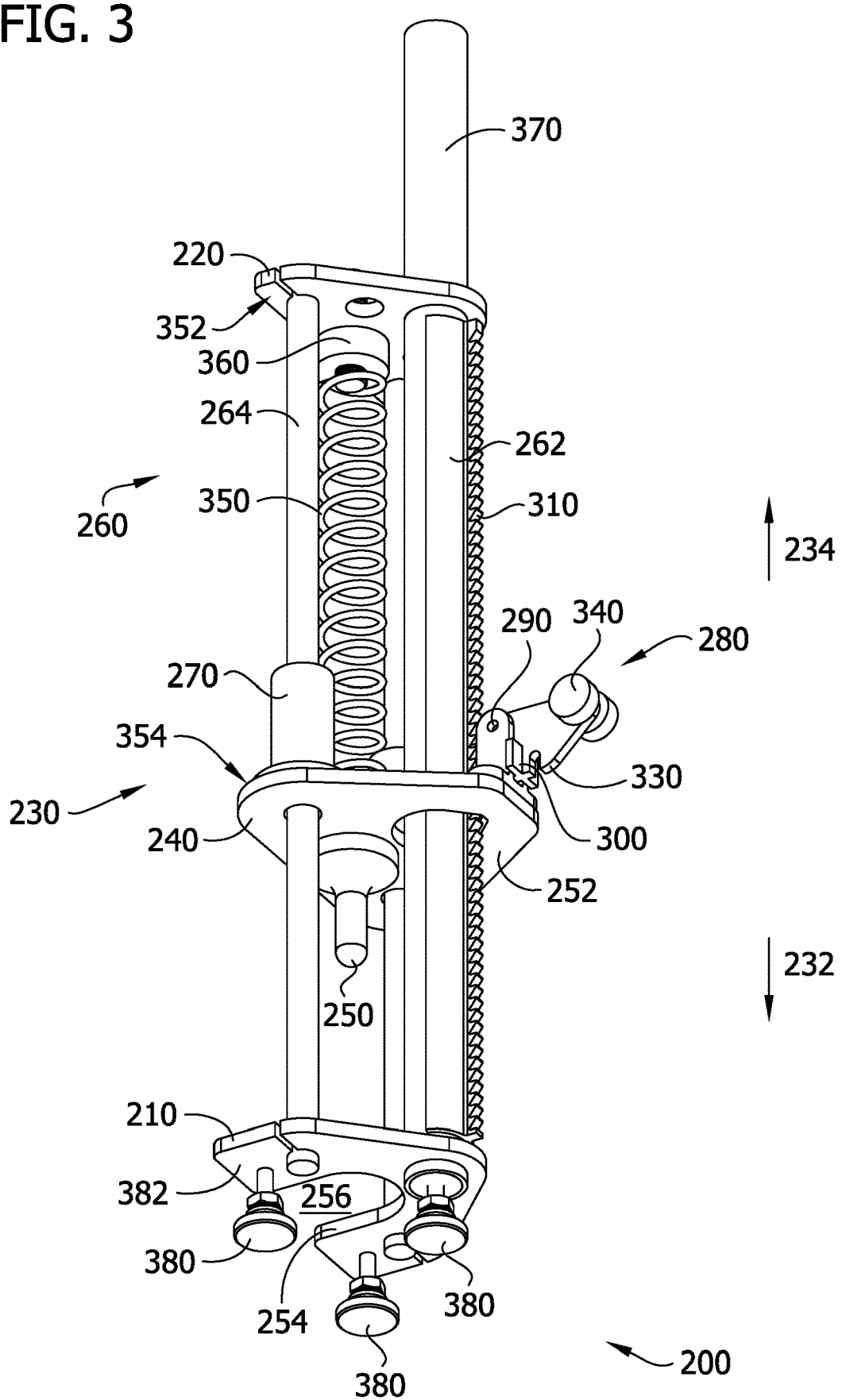
FIG. 3 includes a lower perspective view of the impact test device shown in FIG. 2 in a second state.

FIGS. 2 and 3 show an example impact test device 200 that may be used to perform one or more impact tests on a test object (e.g., aircraft wing 100, support member 110, panel member 120). In some examples, the impact test device 200 includes a first plate 210 (e.g., a lower plate), a second plate 220 (e.g., an upper plate), and a carriage assembly 230 between the first plate 210 and second plate 220. The carriage assembly 230 is moveable in a plurality of directions. The carriage assembly 230 may be moved, for example, in a first direction 232 (e.g., downward or toward the first plate 210) and/or in a second direction 234 (e.g., upward or toward the second plate 220) opposite the first direction 232. While the first plate 210 and second plate 220 are described herein as being a lower plate and upper plate, respectively, and the carriage assembly 230 is described herein as moving in a downward and/or upward direction, the impact test device 200 may be used in any orientation.

The carriage assembly 230 includes a carriage plate 240 and an impactor 250 coupled to the carriage plate 240. In some examples, the impactor 250 extends generally in the first direction 232 (e.g., downwardly) from a surface 252 (e.g., lower surface) of the carriage plate 240. As shown in FIGS. 2 and 3, the first plate 210 may include an edge portion 254 that defines a target area 256 (shown in FIG. 3) aligned with the impactor 250 such that the impactor 250 extends through the target area 256 when the carriage assembly 230 is in an impact position (shown, e.g., in FIG. 2).

The impactor 250 has a mass, size, shape, and/or configuration that allows the impact response of a material and/or structure to be tested in a desired manner. For example, the impactor 250 may be fabricated from a material having strength and/or hardness characteristics suitable for withstanding one or more forces generated during one or more impact tests. Example materials include, without limitation, a ceramic, a metal, a polymer, a stone, a wood, an alloy, and/or a composite. In some examples, the impactor 250 is removably coupled to the carriage plate 240. In this manner, the impactor 250 may be selected from a plurality of impactors 250 having various masses, sizes, shapes, and/or configurations based on a desired application.

The carriage assembly 230 is configured to slide along a plurality of rails 260 extending generally vertically between the first plate 210 and second plate 220. As shown in FIGS. 2 and 3, each rail 260 may extend through a respective opening defined through the carriage plate 240. The rails 260 may include, for example, a control rail 262 and one or more guide rails 264 that restrict or control a movement of the carriage assembly 230. The rails 260 extend generally parallel with each other. In some examples, the carriage assembly 230 includes one or more bearings 270 that facilitate linear movement of the carriage assembly 230. The bearings 270 may be aligned with the guide rails 264 and/or configured to slide along the guide rails 264 with little or no friction.

The carriage assembly 230 includes a catch 280 that may be moved to selectively cooperate with and/or engage the control rail 262. The catch 280 may be moved, for example, between an engaged configuration, in which the catch 280 engages the control rail 262, and a disengaged configuration, in which the catch 280 is disengaged from the control rail 262. In some examples, the catch 280 is biased toward the engaged configuration (e.g., for use in inverted applications). When the catch 280 is in the engaged configuration, the carriage assembly 230 may be restricted from moving in the first direction 232 (e.g., downwardly) and/or second direction 234 (e.g., upwardly). Conversely, when the catch 280 is in the disengaged configuration, the carriage assembly 230 is allowed to move in the first direction 232 and/or second direction 234. As shown in FIGS. 2 and 3, the carriage assembly 230 may include a hinge 290 that pivotably couples the catch 280 to the carriage plate 240, such that the catch 280 is rotatable between the engaged configuration and the disengaged configuration. In some examples, the catch 280 includes one or more stops 300 that are configured to limit a rotation of the catch 280 and/or prevent over-rotation of the catch 280. For example, as shown in FIGS. 2 and 3, a mechanical stop 300 may engage the hinge 290 when the catch 280 is in the engaged configuration.

In some examples, the control rail 262 includes or is coupled to a plurality of rail teeth 310, and the catch 280 includes one or more catch teeth 320 (shown in FIG. 2) that complement and are configured to engage the rail teeth 310. For example, the rail teeth 310 may point or extend generally in one direction, and the catch teeth 320 may point or extend generally in an opposite direction such that the catch teeth 320 are seated between adjacent rail teeth 310 when the catch 280 is in the engaged configuration. When the catch 280 is moved or actuated away from the engaged configuration (e.g., towards the disengaged configuration), the catch teeth 320 are spaced from the rail teeth 310. The catch 280 may include, for example, a handle or a coupler mechanism 330 (shown in FIG. 3) that allows a handle to be attached or secured to the catch 280 for use in actuating the catch 280. In some examples, the rail teeth 310 and/or catch teeth 320 are configured to prevent the carriage assembly 230 from moving in the first direction 232 when the catch 280 is in the engaged configuration while allowing the catch 280 to move away from the engaged configuration (e.g., towards the disengaged configuration) when the carriage assembly 230 is moved in the second direction 234.

The catch 280 includes or is coupled to a weight 340 that biases the catch 280 based on a movement of the carriage assembly 230, including non-movement. For example, the weight 340 may urge the catch 280 to move toward the disengaged configuration when the carriage assembly 230 is moving in the first direction 232 at or greater than a predetermined rate or acceleration. Conversely, the weight 340 may urge the catch 280 to move toward the engaged configuration when the carriage assembly 230 is at rest (e.g., not moving), is moving in the second direction 234, or is moving in the first direction 232 at a rate or acceleration less than the predetermined rate or acceleration. The weight 340 may have any moment of inertia, location, mass, and/or mass distribution that allows the catch 280 to function as described herein. In some examples, the weight 340 is moveable along a slot defined in the catch 280 and/or is positionable in one of a plurality of openings defined in the catch 280 for selectively positioning the weight 340.

The impact test device 200 may include a drive mechanism 350 that selectively propels or urges the carriage assembly 230. The drive mechanism 350 may urge the carriage assembly 230 to move toward the first direction 232 (e.g., downwardly) and/or second direction 234 (e.g., upwardly), for example, based on a position of the carriage assembly 230. In some examples, the drive mechanism 350 is configured to urge the carriage assembly 230 when the carriage assembly 230 is in a loaded position (e.g., a position in which the drive mechanism 350 is in a biased state). Moving the carriage assembly 230 in the second direction 234 (e.g., towards one loaded position) may bias the drive mechanism 350 to urge the carriage assembly 230 to move in the first direction 232. Conversely, moving the carriage assembly 230 in the first direction 232 (e.g., towards another loaded position) may bias the drive mechanism 350 to urge the carriage assembly 230 to move in the second direction 234.

The drive mechanism 350 may be or include a spring and/or any other type of biasing device that allows the impact test device 200 to function as described herein. For example, as shown in FIGS. 2 and 3, the drive mechanism 350 may include a coil spring extending generally vertically between the carriage plate 240 and second plate 220. In some examples, the drive mechanism 350 is coupled to a surface 352 (e.g., lower surface) of the second plate 220 and/or to a surface 354 (e.g., upper surface) of the carriage plate 240 such that the drive mechanism 350 is configured to apply a spring force to the carriage plate 240 in the first direction 232 for moving the carriage assembly 230 in the first direction 232. Applying the spring force to the carriage plate 240 (e.g., ahead of the centroid of friction) allows the bearings 270 to be moved along the guide rails 264 with little or no friction. For example, when a perturbance causes a misalignment of the carriage assembly 230 while the carriage assembly 230 is moving in the first direction 232, a moment or turning effect urging the carriage assembly 230 to realign the bearings 270 with the guide rails 264 may be created.

In some examples, the drive mechanism 350 is attached or secured to the first plate 210, second plate 220, and/or carriage plate 240 such that the carriage assembly 230 is configured to be urged in the first direction 232 only. For example, the drive mechanism 350 may be attached or secured to only one plate (e.g., first plate 210, second plate 220, carriage plate 240) such that the drive mechanism 350 is configured to unload from a biased state and be spaced from the other plates when at equilibrium or in a generally neutral state (e.g., compressed or extended less than 0.10 inches). In this manner, the drive mechanism 350 may be used to increase a kinetic energy of the carriage assembly 230 (e.g., as the drive mechanism 350 is unloaded) without decreasing the kinetic energy of the carriage assembly 230 (e.g., after the drive mechanism 350 is unloaded).

In some examples, the impact test device 200 includes an adjustment mechanism 360 that may be used to adjust or modify the drive mechanism 350 (e.g., for moving an unloaded position). The adjustment mechanism 360 may be used, for example, to selectively increase or decrease a distance spanned by the drive mechanism 350. As shown in FIGS. 2 and 3, the adjustment mechanism 360 may include a threaded spring mount coupled to the second plate 220 for increasing or decreasing a distance or space between the drive mechanism 350 and the surface 352 of the second plate 220 and/or a distance or space between the drive mechanism 350 and the target area 256.

The impact test device 200 is positionable to perform one or more impact tests in situ. The impact test device 200 may include, for example, one or more handles 370 that allow a user to carry or manipulate the impact test device 200 (e.g., for positioning impact test device 200). As shown in FIGS. 2 and 3, a handle 370 may be in line with the control rail 262 and/or extend generally in the second direction 234 (e.g., upwardly) from the second plate 220.

In some examples, the impact test device 200 includes a plurality of feet 380 extending generally in the first direction 232 (e.g., downwardly) from a surface 382 (e.g., lower surface) of the first plate 210. One or more feet 380 are adjustable in position, length, and/or orientation to facilitate stable and/or level placement of the carriage assembly 230 (e.g., on a surface of the test object). The feet 380 may be positioned, for example, such that the impact test device 200 extends generally vertically (e.g., perpendicular to the surface of the test object).

The feet 380 have a size, shape, and/or configuration that allows the impact response of a material and/or structure to be tested in a desired manner. For example, the feet 380 may be fabricated from a padded or soft material that facilitates dampening or mitigating the forces imparted by the feet 380 (e.g., on the surface of the test object). In some examples, the feet 380 are removably coupled to the first plate 210. In this manner, one or more feet 380 may be selected from a plurality of feet 380 having various sizes, shapes, and/or configurations based on a desired application.

Figure 4:
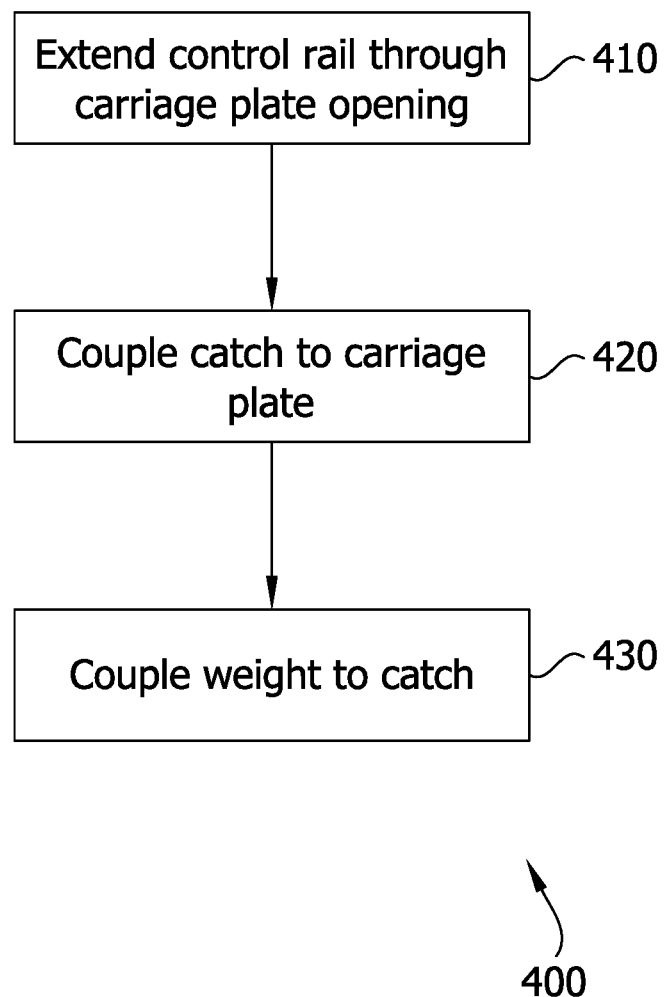
FIG. 4 includes a flowchart of an example method of assembling an impact test device, such as the impact test device shown in FIGS. 2 and 3.
Figure 9:
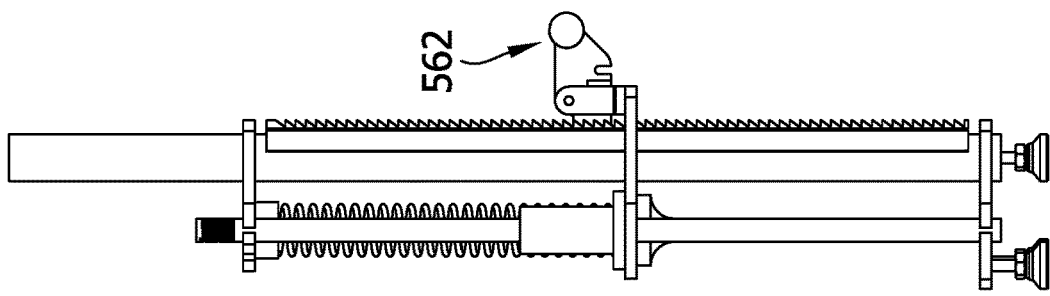
FIGS. 6-9 include side views of the impact test device shown in FIGS. 2 and 3 in various states.
Figure 8:
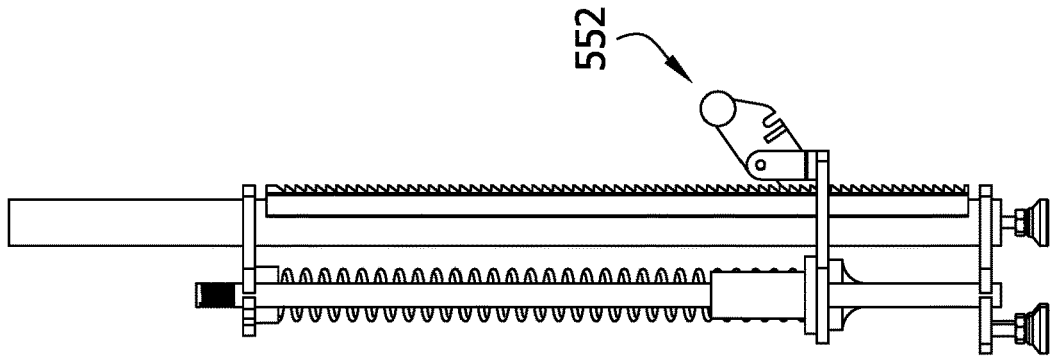
Figure 7:
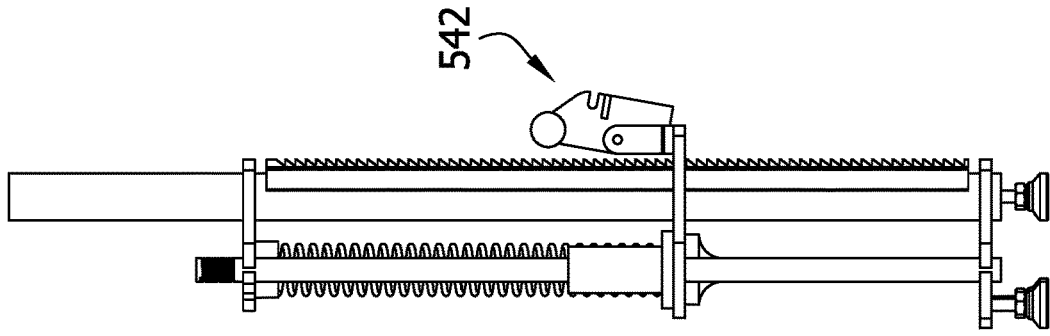

FIG. 4 shows an example method 400 of assembling the impact test device 200. In some examples, a control rail 262 includes a lower portion including a plurality of rail teeth 310 and an upper portion including a handle 370. Alternatively, the handle 370 may extend from the control rail 262.

The control rail 262 is extended through an opening defined in or through a carriage plate 240 at operation 410. The control rail 262 may be vertically extended, for example, such that the carriage plate 240 is slideable along the control rail 262 in a downward direction (e.g., first direction 232) or in an upward direction (e.g., second direction 234). In some examples, the carriage plate 240 is slideable along one or more guide rails 264 generally parallel to the control rail 262. The guide rails 264 may extend, for example, through one or more openings defined in or through the carriage plate 240. Additionally or alternatively, the guide rails 264 may extend through one or more bearing openings defined in one or more slide bearings (e.g., bearing 270) coupled to the carriage plate 240.

An inertial catch (e.g., catch 280) is coupled to the carriage plate 240 at operation 420. The catch 280 may be coupled using a hinge 290, for example, such that the catch 280 is moveable between an engaged configuration and a disengaged configuration. In the engaged configuration, the catch 280 is engaged with the control rail 262. Conversely, in the disengaged configuration, the catch 280 is disengaged from the control rail 262. In some examples, the catch 280 includes a coupler mechanism 330 coupleable to a handle that may be used to actuate the catch 280.

A weight 340 is coupled to the catch 280 at operation 430. The weight 340 may be coupled, for example, such that movement of a carriage assembly 230 including the carriage plate 240, catch 280, and/or weight 340 in the first direction 232 urges the catch 280 to disengage from the control rail 262 and movement of the carriage assembly 230 in the second direction 234 urges the catch 280 to engage the control rail 262. In some examples, a drive mechanism 350 extending between the carriage assembly 230 and/or carriage plate 240 and an end plate (e.g., first plate 210, second plate 220) is configured to urge the carriage assembly 230 based on a position of the carriage assembly 230.

FIG. 5 shows an example method 500 of controlling impact. Impact may be controlled, for example, using an impact test device 200 including a control rail 262 and a carriage assembly 230 moveable along the control rail 262. The impact test device 200 may be selected or configured based on the application. For example, the impact test device 200 may include an impactor 250 that allows the impact response of the impact surface to be tested in a desired manner FIGS. 6-9 show the impact test device 200 at various states of the method 500.

The impact test device 200 is aligned with an impact surface at operation 510. For example, the impact test device 200 may be positioned and/or oriented such that one or more feet 380 are at or on the impact surface and the control rail 262 extends generally perpendicularly from the impact surface. In some examples, the feet 380 are adjusted such that the impact test device 200 sits firmly on or about the impact surface. The adjustment mechanism 360 may be used to adjust the drive mechanism 350 such that the drive mechanism 350 is at equilibrium or in a generally neutral state (e.g., compressed or extended less than 0.10 inches) when the impactor 250 touches or is in contact with the impact surface.

A user may apply or exert a force (e.g., in the second direction 234) to move the carriage assembly 230 along the control rail 262 away from the impact surface at operation 520. In some examples, the catch teeth 320 successively cooperate with and/or engage the rail teeth 310 as the carriage assembly 230 is translated in the second direction 234. For example, a first set of rail teeth 310 may provide a contact force (e.g., in the first direction 232) that at least partially restricts the catch teeth 320 from translating in the second direction 234 at the same rate or acceleration as the carriage plate 240 and/or hinge 290 and forces the catch 280 to rotate toward the disengaged configuration. The catch 280 may rotate until the catch teeth 320 clear (e.g., are spaced from) the first set of rail teeth 310, upon which gravity (e.g., in the first direction 232) forces the catch 280 to rotate toward the engaged configuration and engage a second set of rail teeth 310. Alternatively, the catch 280 may be retained in the disengaged configuration while the carriage assembly 230 is moved along the control rail 262.

Figure 6:
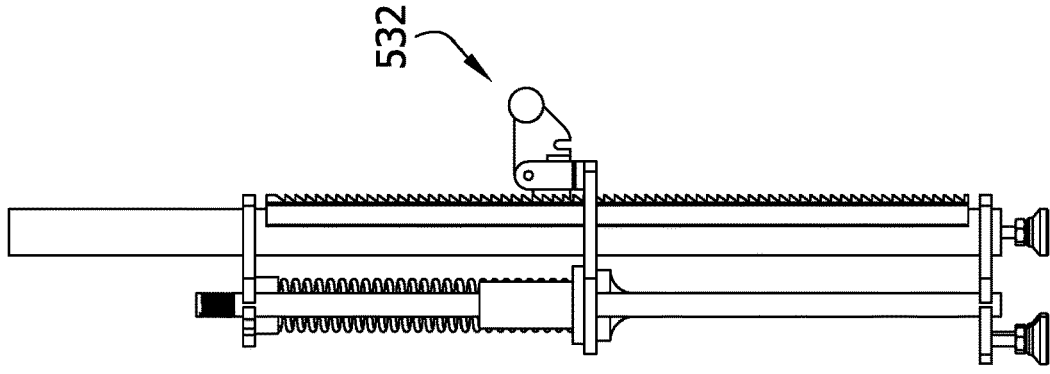

The carriage assembly 230 may be positioned at operation 530, for example, in a ready state 532 (shown in FIG. 6). In the ready state 532, the catch 280 is in the engaged configuration to facilitate maintaining a position of the carriage assembly 230. In some examples, the carriage assembly 230 is positioned at a predetermined location in which the drive mechanism 350 is in a biased (e.g., compressed) state. The predetermined location may be determined or calculated, for example, based on a displacement of the drive mechanism 350 corresponding to a desired impact force (e.g., using Hooke's law), after accounting for any effects of gravity (e.g., due to orientation of impact test device 200) and/or any internal losses.

At operation 540, the catch 280 is actuated or moved toward the disengaged configuration to "release" the catch 280. The catch 280 may be moved, for example, such that the carriage assembly 230 changes from the ready state 532 (shown in FIG. 6) to a live state 542 (shown in FIG. 7). In some examples, the coupler mechanism 330 is coupled to a handle (e.g., a string) that may be used to move or actuate the catch 280.

In the live state 542, the carriage assembly 230 is allowed to move along the control rail 262 in the first direction 232 and/or second direction 234. For example, when the carriage assembly 230 is in an upright orientation, the carriage assembly 230 may be allowed to fall (e.g., due to gravity) in the first direction 232. On the other hand, when the carriage assembly 230 is in an upside-down orientation, the carriage assembly 230 may be forced to overcome gravitational forces to move in the first direction 232. In some examples, the drive mechanism 350 is configured to propel or urge the carriage assembly 230 to move in the first direction 232, with or against gravity, towards the impact surface at a predetermined rate or acceleration. For example, the drive mechanism 350 may unload from a biased state and urge the carriage assembly 230 to move until the drive mechanism 350 is at equilibrium or in a generally neutral state (e.g., compressed or extended less than 0.10 inches). While the carriage assembly 230 is moving in the first direction 232, gravity and/or inertia allow the catch 280 to remain in or, in some examples, be urged to move towards the disengaged configuration. The carriage assembly 230 is allowed to move towards the impact surface until the carriage assembly 230 is in an impact position (shown, e.g., in FIG. 2) in which the impactor 250 imparts an impact force on the impact surface.

After being in the impact position, the carriage assembly 230 enters a rebound state 552 (shown in FIG. 8) and begins to move in the second direction 234. The rate or velocity of the carriage assembly 230 decreases as kinetic energy is converted back into potential energy, and gravity and/or inertia urge the catch 280 towards the engaged configuration. In a rest state 562 (shown in FIG. 9), the catch 280 is in the engaged configuration to facilitate maintaining a position of the carriage assembly 230 and/or preventing re-impact. That is, in at least some examples, the catch 280 is urged toward the disengaged configuration before the carriage assembly 230 impacts the impact surface and is urged toward the engaged configuration after the carriage assembly 230 impacts the impact surface.

Example impact test devices are described herein and illustrated in the accompanying drawings. This written description uses examples to disclose aspects of the disclosure and also to enable a person skilled in the art to practice the aspects, including making or using the above-described systems and executing or performing the above-described methods. Examples described herein may be used to simulate real-world impact forces imparted on various materials and/or structures. Impact forces may be imparted, for example, in various directions, including upwards, while mitigating opportunities for undesired impact forces. Examples described herein enable impact tests to be performed in situ in various applications and/or environments, including on contoured surfaces.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, manufacturing and/or testing equipment.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An impact test device comprising:
    a control rail; and
    a carriage assembly moveable along the control rail in a plurality of directions including a first direction and a second direction opposite the first direction, the carriage assembly including a catch configured to engage the control rail to control movement of the carriage assembly, wherein movement of the carriage assembly in the first direction urges the catch to disengage from the control rail and movement of the carriage assembly in the second direction urges the catch to engage the control rail.

2. The impact test device of claim 1, wherein the carriage assembly includes a carriage plate and an impactor extending from the carriage plate, the control rail extending through an opening defined through the carriage plate.

3. The impact test device of claim 1, wherein the catch is moveable between an engaged configuration and a disengaged configuration, the carriage assembly restricted from moving in the first direction when the catch is in the engaged configuration and allowed to move in the first direction when the catch is in the disengaged configuration.

4. The impact test device of claim 1, wherein the carriage assembly includes a carriage plate and a hinge coupling the catch to the carriage plate.

5. The impact test device of claim 4, wherein the catch includes a stop configured to limit a rotation of the catch.

6. The impact test device of claim 1, wherein the catch includes a weight having a moment of inertia that facilitates urging the catch to move toward a disengaged configuration when the carriage assembly moves in the first direction and urging the catch to move toward an engaged configuration when the carriage assembly moves in the second direction.

7. The impact test device of claim 1, wherein the catch includes a coupler mechanism coupleable to a handle.

8. The impact test device of claim 1 further comprising a first plate and a second plate, the carriage assembly moveable between the first plate and the second plate.

9. The impact test device of claim 1 further comprising an end plate including an edge portion that defines a target area.

10. The impact test device of claim 1 further comprising an end plate and a plurality of feet extending generally downwardly from a lower surface of the end plate.

11. The impact test device of claim 1 further comprising an end plate and a drive mechanism extending between the end plate and the carriage assembly, the drive mechanism configured to bias the carriage assembly based on a position of the carriage assembly.

12. The impact test device of claim 11, wherein the drive mechanism is secured to one of the end plate or the carriage assembly.

13. The impact test device of claim 11 further comprising an adjustment mechanism configured to adjust the drive mechanism.

14. The impact test device of claim 1 further comprising one or more guide rails, the carriage assembly including a carriage plate, the one or more guide rails extending through one or more openings defined through the carriage plate such that the carriage assembly is moveable along the one or more guide rails in the plurality of directions.

15. The impact test device of claim 1 further comprising one or more guide rails, the carriage assembly including one or more bearings configured to slide along the guide rails.

16. The impact test device of claim 1 further comprising a handle extending from the control rail.

17. A method of assembling an impact test device for use in controlling impact, the method comprising:
    extending a control rail through an opening defined in a carriage plate such that the carriage plate is slideable along the control rail in a plurality of directions including a first direction and a second direction;
    coupling a catch to the carriage plate using a hinge such that the catch is moveable between an engaged configuration in which the catch is engaged with the control rail and a disengaged configuration in which the catch is disengaged from the control rail; and
    coupling a weight to the catch such that movement of a carriage assembly including the carriage plate, the catch, and the weight in the first direction urges the catch to disengage from the control rail and movement of the carriage assembly in the second direction urges the catch to engage the control rail.

18. The method of claim 17 further comprising extending a drive mechanism between the carriage plate and an end plate such that the drive mechanism is configured to bias the carriage assembly based on a position of the carriage assembly.

19. The method of claim 17 further comprising extending a guide rail through a bearing opening defined in a slide bearing coupled to the carriage plate.

20. A method of controlling impact using an impact test device, the method comprising:
    aligning the impact test device with an impact surface, the impact test device including a control rail and a carriage assembly moveable along the control rail, the carriage assembly including a catch moveable between an engaged configuration in which the catch is engaged with the control rail and a disengaged configuration in which the catch is disengaged from the control rail;

moving the carriage assembly along the control rail away from the impact surface;

positioning the carriage assembly at a predetermined location, the catch urged toward the engaged configuration when the carriage assembly is positioned at the predetermined location; and moving the catch toward the disengaged configuration such that the carriage assembly is allowed to move towards the impact surface and impact the impact surface, wherein the catch is urged toward the disengaged configuration before the carriage assembly impacts the impact surface and is urged toward the engaged configuration after the carriage assembly impacts the impact surface.

* * * * *